(12) United States Patent
Goldstein

(10) Patent No.: US 7,139,842 B2
(45) Date of Patent: Nov. 21, 2006

(54) METHOD AND APPARATUS FOR INTERSYSTEM CUT/COPY AND PASTE

(75) Inventor: Judith A. Goldstein, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 09/823,215

(22) Filed: Mar. 30, 2001

(65) Prior Publication Data
US 2002/0143985 A1    Oct. 3, 2002

(51) Int. Cl.
*G06F 15/16* (2006.01)

(52) U.S. Cl. .................. 709/246; 709/238; 709/242

(58) Field of Classification Search ............. 709/203, 709/238, 200, 213, 214, 217, 232, 246; 327/239; 370/360, 412; 711/165
See application file for complete search history.

(56) References Cited

U.S. PATENT DOCUMENTS

| | | | | |
|---|---|---|---|---|
| 5,345,327 A | * | 9/1994 | Savicki | 398/212 |
| 5,964,834 A | * | 10/1999 | Crutcher | 709/213 |
| 6,026,433 A | * | 2/2000 | D'Arlach et al. | 709/217 |
| 6,073,161 A | * | 6/2000 | DeBoskey et al. | 709/200 |
| 6,128,654 A | * | 10/2000 | Runaldue et al. | 709/219 |
| 6,172,542 B1 | * | 1/2001 | Williams et al. | 327/239 |
| 6,338,084 B1 | * | 1/2002 | Rankin et al. | 709/214 |
| 6,484,207 B1 | * | 11/2002 | Petersen et al. | 709/232 |
| 6,487,199 B1 | * | 11/2002 | Erimli | 370/360 |
| 6,504,846 B1 | * | 1/2003 | Yu et al. | 370/412 |
| 6,779,094 B1 | * | 8/2004 | Selkirk et al. | 711/165 |

* cited by examiner

*Primary Examiner*—Ario Etienne
*Assistant Examiner*—Emmanuel Coffy
(74) *Attorney, Agent, or Firm*—Molly A. McCall

(57) ABSTRACT

An apparatus in accordance with the invention includes a switch-box, where the switch-box includes a memory buffer to which information is copied from a computing system selected via the switch-box from two or more computing systems coupled with the switch-box as a result of a first substantially predetermined event.

20 Claims, 4 Drawing Sheets

METHOD AND APPARATUS FOR INTERSYSTEM CUT/COPY AND PASTE

BACKGROUND

1. Field

This disclosure relates to transferring information between two or more computing systems and, more particularly, to a method and apparatus for "copying", "cutting" and "pasting" information between such systems.

2. Background Information

Professionals working in various industries, such as the computing and computer networking industries, for example, may employ multiple computing systems in their day-to-day work. The reasons for employing a number of different computing systems may vary based on the particular situation. In this regard, one common practice that may save both cost and office space is to use a single set of interface devices with at least some of the various computing systems that may be employed by a specific user. Interface devices, in this context, may include, but are not limited to keyboards, computer pointing devices, such as mice, and display monitors.

In such situations, an apparatus, such as a "switch-box" may be employed to allow such computing systems to "share" these interface devices. Such switch-boxes are well-known. In such a scheme, a user, by employing such a "switch-box", may couple such interface devices with one computing system to be used at a particular time via the "switch-box." The user may then couple the interface devices to a different computing system by employing the "switch-box" to, for example, perform a different task.

Alternatively, a user may need to employ multiple systems in his/her work that may be in physically separate locations where a "switch-box" technique may not be practical. For example, one computing system may be in the user's office while another computing system might be located in a development lab.

In the above situations, it is desirable at times to copy or transfer information, such as electronic information, between such computing systems. Current methods of performing such copying or transferring include employing a temporary file on a common computing network, such as on a network file server, with which such computing systems may be coupled, or, alternatively, using a removable storage medium, such as a floppy diskette, when a common network is not employed or available. Such techniques are typically time consuming or inconvenient. Therefore, alternative techniques for performing such transfers of information are desirable.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

As was indicated above, it may be desirable to employ a single set of interface devices with multiple computing systems. In this context, interface devices may include, but are not limited to computer keyboards, computer pointing devices and display monitors. A current approach for implementing such a configuration is illustrated in prior art FIG. 1.

Figure 1:
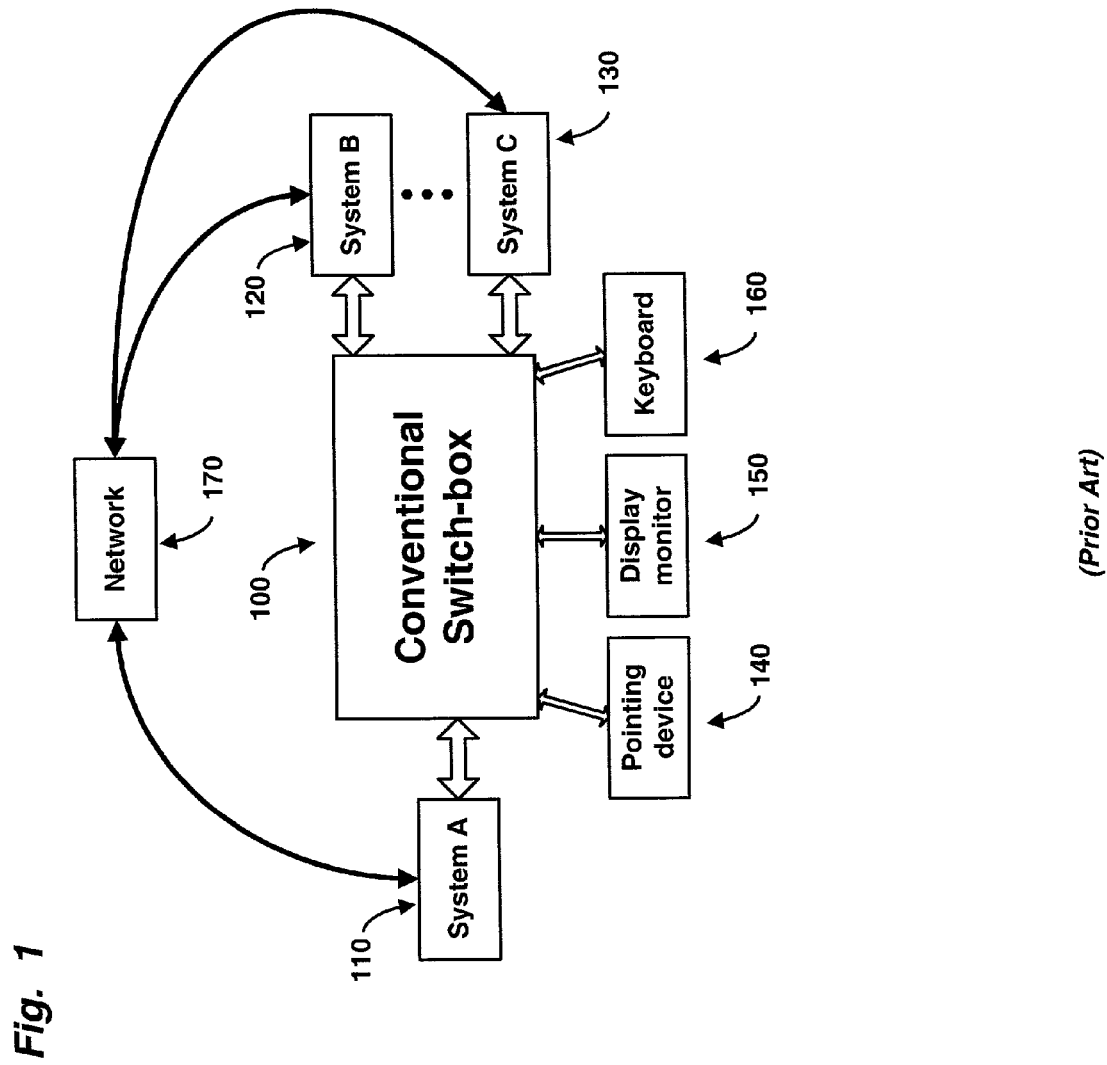
FIG. 1 is a block diagram of a prior art scheme for utilizing multiple computing systems.

FIG. 1 is a block diagram illustrating a scheme for sharing a single set of interface devices between multiple computing systems, in this case, three such computing systems. In this particular implementation, the set of interface devices, which comprises pointing device 140, display monitor 150 and keyboard 160 (hereafter "interface devices"), are coupled with conventional switch-box 100. Such interface devices are well-known, and are typically compatible with various computing systems. Conventional switch-box 100 is further coupled with System A 110, System B 120 and System C 130. These systems would, for this particular implementation, typically be coupled with conventional switch-box 100 via substantially similar techniques as are used to couple the set of interface devices with conventional switch-box 100.

In such implementations, conventional switch-box 100 would typically comprise a selection switch to allow the set of interface devices to be coupled, at substantially individual times, with any of the three computing systems via conventional switch-box 100. Such selection switches are well-known and the specific switch employed may depend, at least in part, on the particular situation in which such an implementation is employed.

At times, as was indicated above, it may be desirable to copy certain information from one system to another, such as, for example, without limitation, "copying " an Internet Uniform Resource Locater (URL) from System A 110 to System C 130. In configurations such as the one illustrated in FIG. 1, such a copy operation would typically be accomplished by employing a common computer network, such as network 170. Such a technique would typically involve copying the desired information to a standard cut-and-paste buffer included in, for example, an operating system that may be employed on System A 110. The use of such cut-and-paste buffers for "copying", "cutting" and "pasting" information between applications and/or files running and/or included within a single computing system are well-known. Copying and/or cutting information to, and pasting information from such a cut-and-paste buffer may be accomplished by using substantially predetermined keystroke sequences or combinations, though such techniques are not so limited. It is noted that for purposes of this disclosure, the terms "cut" and "copy" are used interchangeably and use of either of these terms is intended to embody both concepts of "cutting" and "copying" information in such embodiments.

However, in this scenario, where it is desired to copy information from one system and paste it to another, the interface devices would initially be coupled with System A 110 via conventional switch-box 100. A temporary file would then typically be created on network 170 and opened, for example, by a user carrying out such a copy operation. In this regard, network 170 may comprise a network file server on which such temporary files may be created and stored. Information, which may be cut or copied into the operating-system cut-and-paste buffer, in this case the URL, would then typically be "pasted" into this temporary file, and that file may then be saved and closed. The user may then couple the interface devices with System C 130 via conventional switch-box 100 by "toggling" the selection switch included in such a switch-box. The user would then access and open the temporary file, "copy" or "cut" the information copied from System A 110 into a standard cut-and-paste buffer included in, for example, an operating system of System C 130. The information may then, subsequently be "pasted" in to a desired application, such as an Internet browser application in this specific case of copying and pasting a URL. Alternatively, for example, a temporary file may be created on a removable storage medium, such as a floppy diskette, and the desired information transferred via this file. Techniques such as the foregoing, however, may be time consuming and inconvenient. Therefore, alternative techniques for "copying", "cutting" and "pasting" information between multiple computing systems are desirable.

Figure 2:
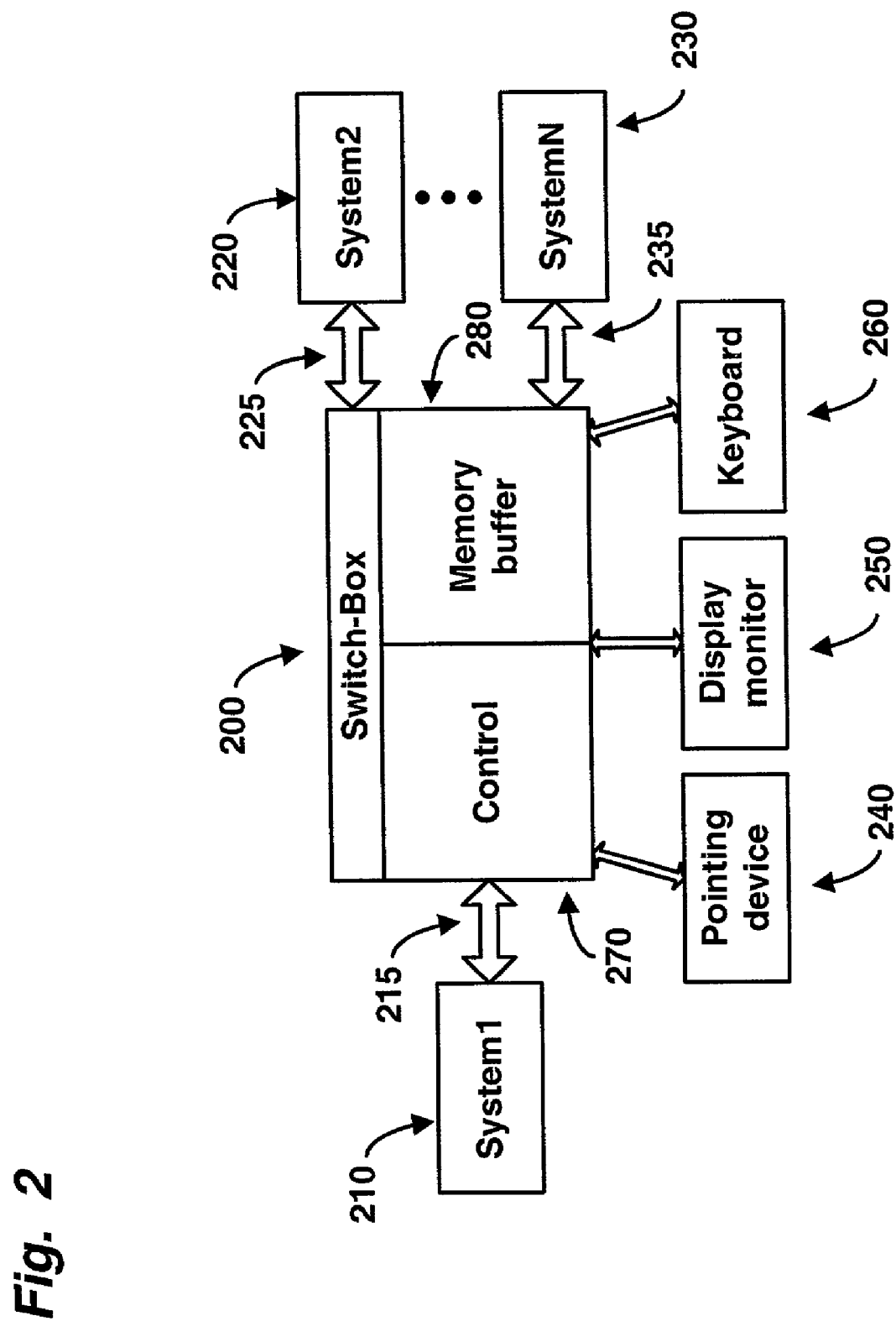
FIG. 2 is a block diagram of an intersystem cut/copy and paste scheme in accordance with the invention.

FIG. 2 is a block diagram illustrating an embodiment in accordance with the invention that may address at least some of the foregoing disadvantages associated with current techniques. While the invention is, of course, not limited to any specific embodiment, in this particular embodiment, switch-box 200 may allow a user to copy information from one system to another, such as from System1 210 to System2 220 without employing a temporary file, a computer network, or a removable storage media. In this regard switch-box 200 comprises control 270 and a memory buffer 280. While the invention is not so limited, for this embodiment, control 270 of switch-box 200 may be employed to recognize a substantially predetermined event, or events that may indicate a user's intent to "copy" or "cut" information from a selected one of computing systems; System1 210, System2 220 or SystemN 230 to memory buffer 270. For such embodiments, control 270 may also be employed to recognize another substantially predetermined event, or events, that may indicate a user's intent to "paste" information from memory buffer 280 to one of the computing systems.

For this embodiment, the substantially predetermined events employed to indicate that a user desires to "copy", "cut" or paste information by employing memory buffer 280 may comprise certain substantially predetermined, substantially predefined keystroke sequences or combinations, though the invention is not limited in this respect, and alternatives, such as, for example, pointer device sequences or voice commands may exist. Such operations carried out within a single platform are well-known. For example, certain computing systems may copy information selected by a user to a standard cut-and-paste buffer included in an operating system for such a system as a result of a user depressing specific keystroke combinations. For example, depressing, on a standard keyboard, the "Ctrl" key and the "c" key simultaneously may result in such selected information being "copied" to such a cut-and-paste buffer. A "cut" to, or a "paste" from a standard cut-and-past buffer may likewise be accomplished by employing alternative key combinations.

For switch-box 200, control 270 may be employed to recognize such key sequences and perform such cut/copy and paste operations employing memory buffer 280 as a result of the occurrence of such keystroke combinations. However, employing substantially identical keystroke combinations for such operations within a single computing system and by employing switch-box 200 may create undesired results. For example, were a user to indicate that a paste is desired by, for example, depressing the "Ctrl" key and the "v" key simultaneously on one of the computing systems, a conflict may occur if information has been cut or copied to both memory buffer 280 and a standard cut-and-paste buffer for that system. Therefore, it may be desirable to employ substantially dedicated keystroke sequences for performing such operations utilizing memory buffer 280, for this embodiment.

In this regard, of course depending on the particular embodiment, a user may indicate that it is desired to copy selected information to memory buffer 280 by depressing and releasing the "Ctrl" key and then, within a substantially predetermined time, depressing and releasing the "c" key. In this regard, control 270 may comprise a timer or counter to determine the time elapsed between keystrokes. If the substantially predetermined keystroke sequence is recognized and the time elapsed between the keystrokes is within the substantially predetermined time limit, control 270 may indicate to memory buffer 280, and the computing system from which information is to be to be copied, to copy such selected information to memory buffer 280. Similar alternative substantially predetermined, substantially time limited keystroke sequences may be employed to indicate that cutting information to, or pasting information from memory buffer 280 is desired. Various techniques for recognizing such time-limited keystroke sequences exist and the invention is not limited in scope to any particular technique. As one example, a micro-controller may be employed to recognize such keystroke sequences, calculate the time elapsed between keystrokes and provide an indication that a substantially predetermined time-limited keystroke sequence indicating a cut, paste or copy operation is to be performed.

For the embodiment in accordance with the invention illustrated in FIG. 2, couplings 215, 225 and 235 may comprise couplings to allow the interface devices; pointing device 240, display monitor 250 and keyboard 260, to be coupled, via switchbox 200, to, respectively, System1 210, System2 220 or SystemN 230. It is noted that N in "SystemN" is intended to indicate that, depending on the particular embodiment, more than three computing systems may be coupled with switch-box 200. These couplings 215, 225 and 235 may also comprise a coupling for transferring information between the computing systems and switch-box 200 during cut, copy and paste operations. The invention is, of course, not limited to any particular method of implementing such a coupling. However, by way of example, such a coupling may comprise a parallel interface, a serial interface, such as a Universal Serial Bus (USB) compliant interface, or an infrared communication interface. The USB Revision 2.0 specification is well known and is available from the Universal Serial Bus Implementers Forum, Inc., 5440 SW Westgate Dr. Suite 217, Portland, Oreg. 97221, or on the World Wide Web at http://www.usb.org/developers/docs.html.

Figure 3:
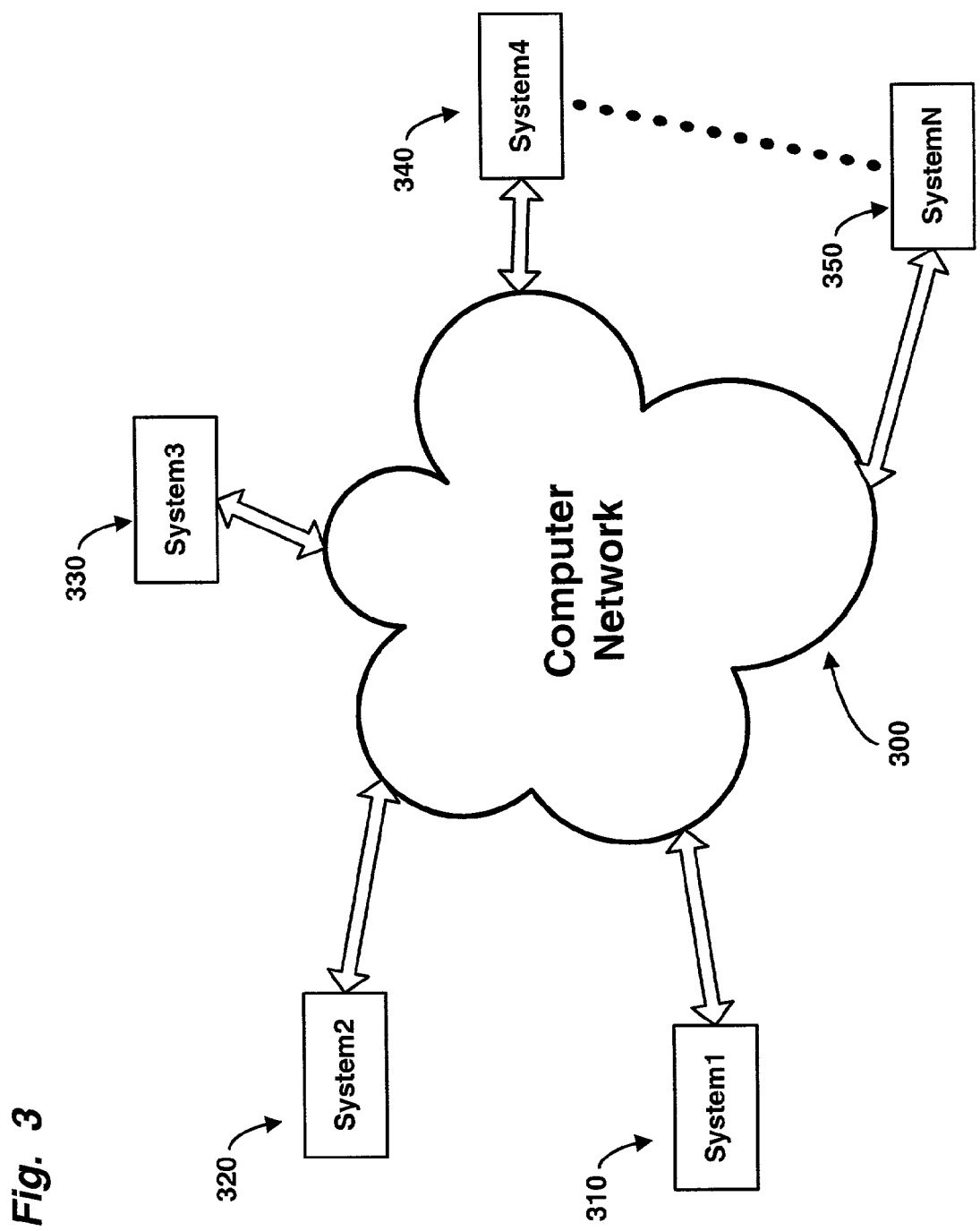
FIG. 3 is a block diagram of an embodiment of a computer network that may be employed with embodiments in accordance with the invention, such as the embodiment illustrated in FIG. 4.

As was previously indicated, it may be desirable to copy, cut and paste information in a similar fashion as the foregoing discussion with respect to FIG. 2 between systems in physical locations where employing a switch-box, such as switchbox 200, may not be practical. In this regard, it may be desirable to perform such information transfers between systems coupled with a common network, such is illustrated in FIG. 3. In this figure, various computing systems; System1 310, System2 320, System3 330, System4 340 and SystemN 350, are coupled with computer network 300. In order to cut and/or copy and paste information between such systems, a technique such as the one discussed with regard to FIG. 1 would typically be employed. As was also indicated, alternative techniques are desirable as such an approach may be time consuming and inconvenient.

Figure 4:
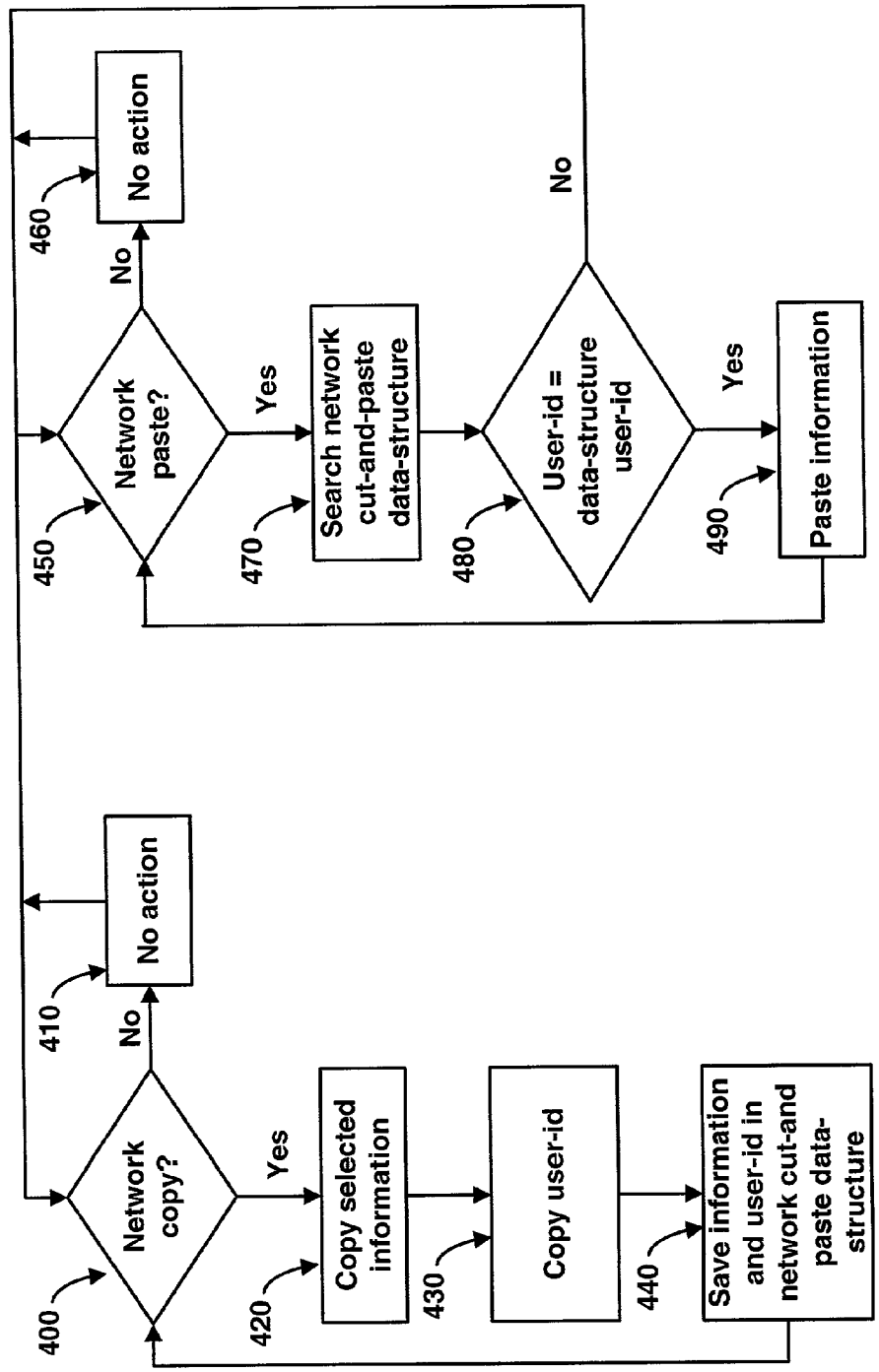
FIG. 4 is a flow diagram of a method for performing an intersystem cut/copy and paste in accordance with the invention.

FIG. 4 illustrates an embodiment of a method in accordance with the invention that may be employed to cut/copy and paste information between computers coupled with a common computer network without the use of a temporary file. In this regard, the left side of FIG. 4 illustrates an embodiment of a network cut/copy in accordance with the invention, while the right side of FIG. 4 illustrates an embodiment of a network paste in accordance with the invention. The invention is, of course, not limited to these specific embodiments and alternatives may exist.

In block 400 of FIG. 4, a computing system may determine whether a network cut/copy request has been generated. Such a request may be generated in a substantially similar fashion as was described above by employing a substantially predetermined, substantially time-limited keystroke sequence, though, of course, the invention is not limited in scope in this respect. If a network cut/copy request has not been generated, no action would typically be taken, as in block 410, and the system may return to determining whether such a request has been generated. When a network cut/copy request is indicated by the appropriate substantially predetermined event, selected information may be cut/copied in block 420. In block 430, a user identification (user-id), such as a network login identification (login-id) may be copied to be associated with the copied information. In block 440, the copied information and the user-id may be stored in a network cut-and-paste data-structure. While many alternatives exist, one technique for implementing such a data-structure, so the user-id would be associated with the copied information, may comprise employing an array data-structure or similar data-structure such as, for example, a linked-list. In this regard, an array data-structure may comprise at least one user-id data-field and at least one corresponding information data-field. The use of such data-structures is well known. In such an embodiment, at block 440, the user-id and information would typically be stored in associated respective user-id and information data-fields in such an array.

A user may then log on to a physically remote computing system. Such a system may determine whether a network paste request has been generated at block 450. If such a request has not been generated, no action would be taken at block 460 and the system may return to waiting for such a request. The user may then indicate that a network paste is desired in a substantially similar fashion as has been previously discussed by employing a substantially predetermined, substantially time-limited keystroke sequence. As a result of a network paste request being generated, the physically remote computing system may, as at block 470, search the network cut-and-paste data structure, searching for the user-id and any associated information stored in such a data structure. If the user-id matches an entry in the data-structure at block 480, the information associated with the user-id may then be pasted, as has been previously discussed. If the user-id is not found in the data-structure the system may then return to block 400 or 450 and resume waiting, respectively, for a subsequent network cut/copy request or a network paste request. The invention is, of course, not limited to this specific implementation and many alternatives may exist.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An apparatus comprising:
a switch-box, wherein the switch-box comprises a control, the control to copy information to a network cut-and-paste data-structure from a first computing system selected via the switch-box from two or more computing systems coupled with the switch-box as a result of the control recognizing a first dedicated predetermined event, wherein the first computing system comprises a standard cut-and-copy buffer, wherein the execution of the first dedicated predetermined event causes the information to be associated with a user-id and to be copied to the network cut-and-paste data-structure and not to the standard cut-and-copy buffer of the first computing system, wherein the information associated with the user-id is copied from the network cut-and-paste data-structure to a second computing system of the two or more computing systems as a result of the control recognizing the execution of the second dedicated predetermined event, wherein the network cut-and-paste data structure comprises an array including a user-id data-field and an information-field and wherein associating the user-id with the copied information comprises copying the user-id to a user-id data-field for a specific one array entry and copying the information to a corresponding information data-field for the specific one array entry.

2. The apparatus of claim 1, wherein the first and second dedicated predetermined events are predetermined respective first and second keystroke sequences.

3. The apparatus of claim 2 further comprising a timer employed, at least in part, to recognize the first and second keystroke sequences.

4. The apparatus of claim 1, wherein the two or more computing systems are coupled with the switch-box via a data transfer coupling and a set of interface device couplings.

5. The apparatus of claim 4, wherein the data transfer coupling comprises a parallel interface.

6. The apparatus of claim 4, wherein the data transfer coupling comprises a serial interface.

7. The apparatus of claim 6, wherein the serial interface comprises a Universal Serial Bus (USB) interface.

8. The apparatus of claim 4, wherein the data transfer coupling comprises an infrared communication interface.

9. A method comprising:
copying information from a first computing system of at least two or more computing systems to a network cut-and-paste data-structure, a switch-box being accessible by the two or more computing systems, the copying occurring as a result of a control in the switch-box recognizing a first dedicated predetermined event, wherein the first computing system comprises a standard cut-and-copy buffer, wherein the execution of the first dedicated predetermined event causes the information to be associated with a user-id and to be copied to the network cut-and-paste data-structure and not to the standard cut-and-copy buffer of the first computing system; and copying the information associated with the user-id in the network cut-and-paste data-structure to a second computing system of the two or more computing systems as a result of the control recognizing the execution of a second dedicated predetermined event, wherein the network cut-and-paste data structure comprises an array including a user-id data-field and an information-field and wherein associating the user-id with the copied information comprises copying the user-id to a user-id data-field for a specific one array entry and copying the information to a corresponding information data-field for the specific one array entry.

10. The method of claim 9, wherein copying information to the network cut-and-paste data-structure is accomplished by employing the standard cut-and-paste buffer of the first computing system.

11. The method of claim 9, wherein the first and second dedicated predetermined events comprise predetermined, time-limited respective first and second keystroke sequences.

12. The method of claim 11, wherein the first and second keystroke sequences are keystroke sequences defined by respective operating systems of the first computing system and the second computing system for accessing standard cut-and-paste buffers employed by those systems.

13. The method of claim 9, wherein the first and second keystroke sequences are dedicated keystroke sequences for copying information to and from the external buffer.

14. A method comprising:

determining by a control in a switch-box that a first dedicated predetermined event has been generated by a user at a first computing system, wherein the user has an associated user-id and wherein the first computing system comprises a standard cut-and-copy buffer;

copying information from the first computing system to a network cut-and-paste data-structure and not to the standard cut-and-copy buffer of the first computing system as a result of the execution of the first dedicated predetermined event;

associating the copied information with the associated user-id in the network cut-and-paste data-structure;

determining by the control that a second dedicated predetermined event has been generated by the user at a second computing system; and searching the network cut-and-paste data structure as a result of the second dedicated predetermined event, wherein the execution of the second dedicated predetermined event causes the information with the associated user-id to be copied from the network cut-and-paste data structure to the second computing system, wherein the network cut-and-paste data structure comprises an array including a user-id data-field and an information-field and wherein associating the user-id with the copied information comprises copying the user-id to a user-id data-field for a specific one array entry and copying the information to a corresponding information data-field for the specific one array entry.

15. The method of claim 14, wherein determining that the first dedicated predetermined event was generated comprises recognizing a first predetermined, time-limited event.

16. The method of claim 15, wherein determining that the second dedicated predetermined event has been generated comprises recognizing a second predetermined, time-limited event.

17. The method of claim 16, wherein the first and second predetermined, time-limited events comprise respective first and second keystroke sequences.

18. The method of claim 14, wherein copying information comprises employing a standard cut-and-paste buffer for an operating system of the first computing system.

19. An article comprising: a storage medium having a plurality of machine-readable instructions, wherein when the instructions are executed by a computing system, the instructions provide for determining by a control in a switch-box that a first dedicated predetermined event has been generated by a user at a first computing system, wherein the user has an associated user-id and wherein the first computing system comprises a standard cut-and-copy buffer;

copying information from the first computing system to a network cut-and-paste data-structure and not to the standard cut-and-copy buffer of the first computing system as a result of the execution of the first dedicated predetermined event;

associating the copied information with the associated user-id in the network cut-and-paste data-structure;

determining by the control that a second dedicated predetermined event has been generated by the user at a second computing system;

searching the network cut-and-paste data structure as a result of the second dedicated predetermined event, wherein the execution of the second dedicated predetermined event causes the information with the associated user-id to be copied from the network cut-and-paste data structure to the second computing systems, wherein the network cut-and-paste data structure comprises an array including a user-id data-field and an information-field and wherein associating the user-id with the copied information comprises copying the user-id to a user-id data-field for a specific one array entry and copying the information to a corresponding information data-field for the specific one array entry.

20. The article of claim 19, wherein determining that the first dedicated predetermined event was generated comprises recognizing a first predetermined, time-limited event and determining that the first dedicated predetermined event was generated comprises recognizing a second predetermined, time-limited event.

* * * * *